C. A. ERICKSON.
CHILD'S HAND CAR.
APPLICATION FILED FEB. 21, 1910.
1,018,656.
Patented Feb. 27, 1912.
2 SHEETS—SHEET 1.
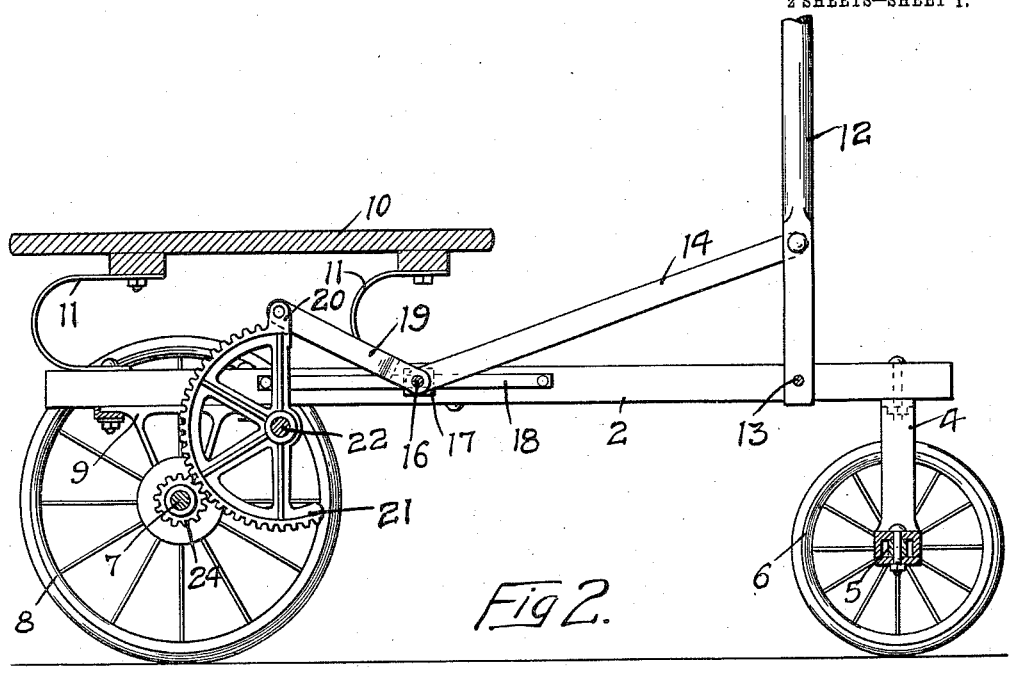
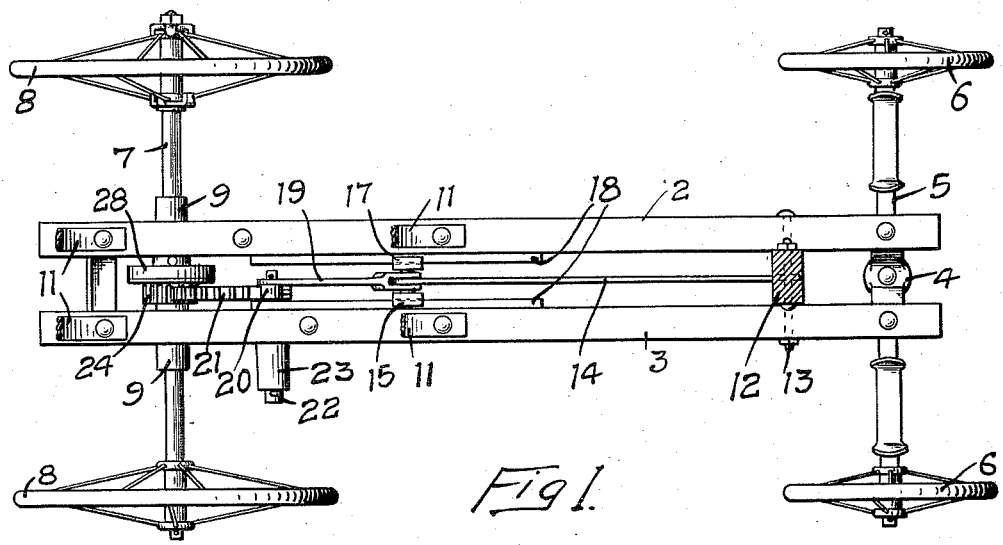
WITNESSES
INVENTOR
CHARLES A. ERICKSON
BY
ATTORNEYS C. A. ERICKSON.
CHILD'S HAND CAR.
APPLICATION FILED FEB. 21, 1910.
1,018,656.
Patented Feb. 27, 1912.
2 SHEETS—SHEET 2.
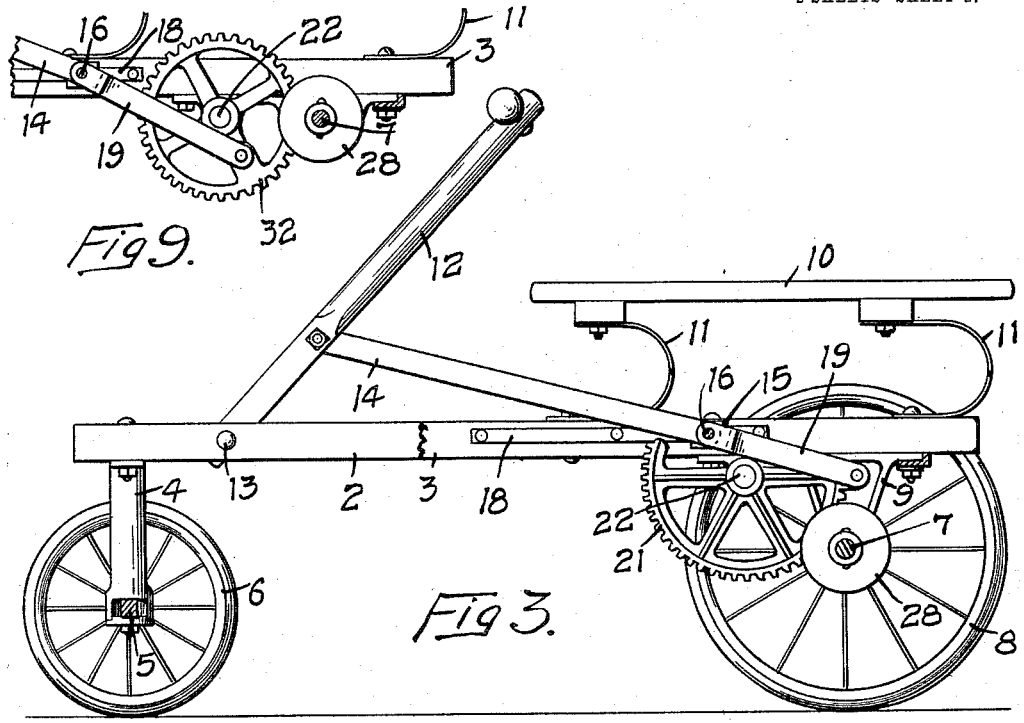
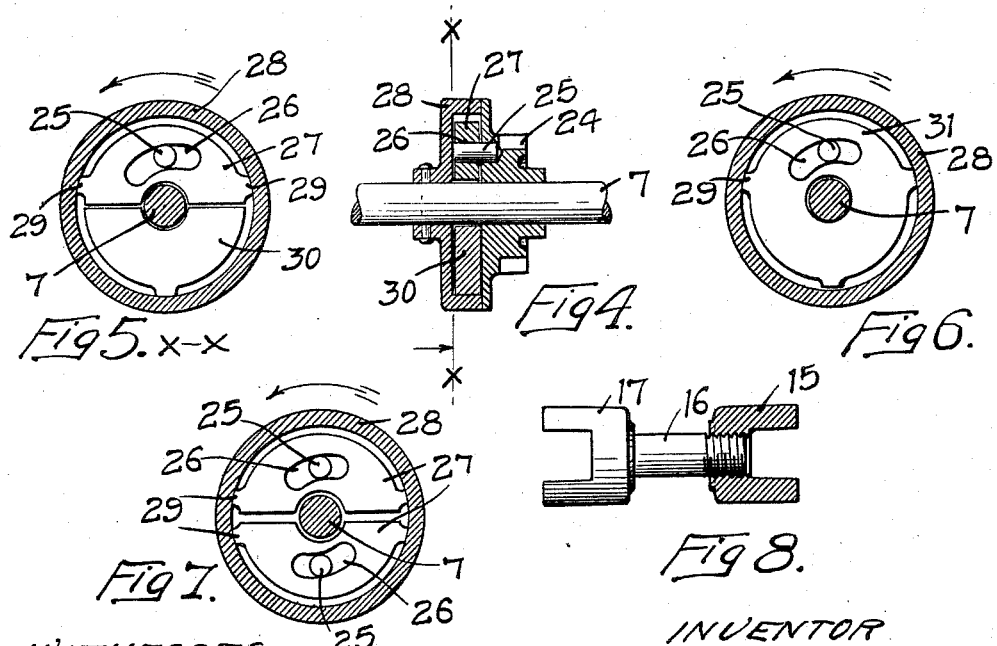
WITNESSES
INVENTOR
CHARLES A. ERICKSON
BY Paul & Paul
ATTORNEYS

UNITED STATES PATENT OFFICE.

CHARLES A. ERICKSON, OF MINNEAPOLIS, MINNESOTA.

CHILD'S HAND-CAR.

1,018,656. Specification of Letters Patent. Patented Feb. 27, 1912.

Application filed February 21, 1910. Serial No. 545,056.

*To all whom it may concern:*

Be it known that I, CHARLES A. ERICKSON, of Minneapolis, Hennepin county, Minnesota, have invented certain new and useful Improvements in Children's Hand-Cars, of which the following is a specification.

My invention relates to a child's hand car having a propelling means, and the object of the invention is to provide a car which can be operated at a high speed and equipped with a mechanism having a greater leverage on the driving gears than usual in devices of this kind, and in which there will be no dead centers.

A further object is to provide a simple, inexpensive apparatus and one which will be extremely strong and durable.

In the accompanying drawings forming part of this specification, Figure 1 is a plan view of a car embodying my invention, Fig. 2 is a vertical, sectional view of the same, Fig. 3 is a side elevation, partially in section, Fig. 4 is a detail sectional view of the driving connection with the rear axle, Fig. 5 is a sectional view on the line $x$—$x$ of Fig. 4, Fig. 6 is a detail view illustrating a modified construction, Fig. 7 is a similar view showing another construction, Fig. 8 is a detail view of the sliding block carried by the frame of the car, Fig. 9 is a detail view illustrating a modified construction of the drive wheel.

In the drawing, 2 and 3 represent parallel bars supported at their forward ends upon a bolster 4 mounted on a forward axle 5 that is provided with carrying wheels 6. A rear axle 7 has carrying wheels 8 and brackets 9 supporting the rear ends of the bars 2 and 3. A seat 10 is arranged above the rear axle upon suitable springs 11. An operating lever 12 is pivoted at 13 between the bars 2 and 3 and connected by a link 14 with a sliding block arranged between the bars 2 and 3. This block consists preferably of a U-shaped casting 15 having a threaded socket to receive the threaded end of a stud 16 on a similar casting 17. Parallel guides 18 are mounted on the bars 2 and 3 and project into the space between the bars and form guides for the castings 15 and 17. The threaded connection of the stud with one of the castings allows the adjustment of one casting toward or from the other one to adapt them for the distance between the guides and to take up wear or lost motion. The link 14 has a pivotal connection with the stud 16 and a forked link 19 pivotally connects the stud 16 with a lug 20 which projects outwardly from the periphery of a semi-circular gear 21, having a stud 22 journaled in a bearing 23 in the bar 3. A pinion 24 is loosely mounted on the rear axle and carries a pin 25 which projects into a cam groove 26 formed in the disk 27 that is arranged within a casing 28 that is secured on the rear axle. The disk 27 has lugs 29 formed thereon and a corresponding disk 30 is provided on the other side of the axle and arranged to bear on the opposite wall of the casing. The pin 25, as the pinion revolves, bears on the outer edge of the cam groove 26 and presses the disk 27 outwardly, causing the lugs 29 to be wedged into the casing 28 and temporarily connecting the loosely mounted pinion with the rigidly mounted casing. The disk segment 30 contacts with the edge of the disk 27 and prevents it from sliding around in the casing or following the pin and insures the wedging of the lugs 29 against the wall of the casing. The position of the lug 20 outside the periphery of the gear, increases the leverage on the gear and in the reciprocation and oscillation of the gear there will be no point in which the axis of the gear and the pivots of the link 19 will be in line and consequently there will be no dead center in the operation of the driving mechanism.

In Fig. 6 a modified construction is shown, in which the disk 31 performs the functions of the disks 27 and 30 of Fig. 5.

In Fig. 7 the construction shown corresponds substantially to that of Fig. 5 except that two grooves and two pins are shown, being merely a duplication of the construction of Fig. 5. This construction has the effect of increasing the frictional surface of the disk within the casing and insures a more positive action on the driving mechanism.

In Fig. 9 I have shown a modified construction in which the gear 32 is a continuous circle so that it may be driven continuously in one direction. In this construction it is necessary to put the pivotal connection of the link 19 with the gear within the circumference of the gear. The leverage, however, will be considerably reduced from that of the gear shown in the other figures.

I claim as my invention:—

1. The combination, with the forward and rear axles and carrying wheels, of a frame, a gear journaled therein, a driving means connecting said gear with said rear axle, parallel guides mounted in said frame, a block composed of U-shaped castings, one of said castings having a threaded stud and the other a threaded socket to receive said stud, said castings sliding on said guides, an operating lever, and links pivotally connecting said stud with said operating lever and with said gear, substantially as described.

2. The combination, with the forward and rear axles and carrying wheels, of a frame, a gear journaled therein and having driving connections with the rear axle, said frame having parallel guides, a block slidable on said guides and composed of relatively adjustable sections, an operating lever, a link connecting said operating lever with said block, and a second lever connecting said block with said gear.

3. The combination, with the forward and rear axles and carrying wheels, of parallel bars supported on substantially the same level on said axles and having guides on their inner faces also on substantially the same level, a slide movable between said bars and supported by said guides, a rocking, semi-circular gear having a driving connection with said rear axle, a link pivotally connecting said gear with said slide, an operating lever pivoted between the forward portions of said bars, and a second link connecting said slide with said operating lever.

4. The combination, with the forward and rear axles and carrying wheels, of a frame supported on said axles, a gear journaled in said frame and having a driving connection with said rear axle, said frame having parallel guides, a slide movable between said guides, an operating lever mounted in said frame, a link pivotally connecting said lever with said slide, a second link pivotally connecting said slide with said gear, the axis of said gear and the pivots of said second link being out of line with one another at all points in the movement of said slide, whereby dead centers will be prevented in the movement of said lever.

5. The combination, with the forward and rear axles and carrying wheels, of a frame supported on said axles, a gear journaled in said frame and having a driving connection with said rear axle, a slide movable lengthwise of said frame, an operating lever mounted on said frame, a link pivotally connecting said lever with said slide, a second link pivotally connecting said slide with said gear, the axis of said gear and the pivots of said second link being out of line with one another at all points in the movement of said slide, whereby dead centers will be prevented in the movement of said lever.

In witness whereof, I have hereunto set my hand this 19" day of February 1910.

CHARLES A. ERICKSON.

Witnesses:
L. C. CRONEN,
J. A. BYRNES.

---

Copies of this patent may be obtained for five cents each, by addressing the "Commissioner of Patents, Washington, D. C."